(12) United States Patent
Chen et al.

(10) Patent No.: US 10,918,021 B1
(45) Date of Patent: Feb. 16, 2021

(54) PLANT LIGHT SUPPLEMENT LAMP AND LAMP GROUP AND LIGHT CONFIGURATION SYSTEM AND METHOD THEREFOR

(71) Applicant: Dongguan City CLED Optoelectronic Technology Co., Ltd., Guangdong (CN)

(72) Inventors: Dehua Chen, Guangdong (CN); Xinhai Li, Guangdong (CN); Guangxin Xiao, Guangdong (CN)

(73) Assignee: Dongguan City CLED Optoelectronic Technology Co., Ltd., Dongguan (CN)

( * ) Notice: Subject to any disclaimer, the term of this patent is extended or adjusted under 35 U.S.C. 154(b) by 0 days.

(21) Appl. No.: 16/676,403

(22) Filed: Nov. 6, 2019

(51) Int. Cl.
| | | |
|---|---|---|
| *A01G 7/04* | (2006.01) | |
| *F21V 21/34* | (2006.01) | |
| *F21V 23/00* | (2015.01) | |
| *H05B 45/10* | (2020.01) | |
| *F21Y 115/10* | (2016.01) | |

(52) U.S. Cl.
CPC .............. *A01G 7/045* (2013.01); *F21V 21/34* (2013.01); *F21V 23/008* (2013.01); *H05B 45/10* (2020.01); *F21Y 2115/10* (2016.08)

(58) Field of Classification Search
CPC .......... A01G 7/02; A01G 7/045; A01G 9/249; H05B 45/10; F21V 23/008; F21V 21/34; F21V 33/006; F21V 23/003; F21Y 2115/10; F21Y 2103/10; F21W 2131/40; Y02A 9/249; Y02A 40/256; Y02P 60/149
See application file for complete search history.

(56) References Cited

U.S. PATENT DOCUMENTS

| | | | |
|---|---|---|---|
| 10,080,334 B2 * | 9/2018 | Li | A01G 9/247 |
| 2010/0039804 A1 * | 2/2010 | Budde | A01G 7/045 362/231 |
| 2015/0264871 A1 * | 9/2015 | Finnerty | A01G 9/24 47/62 A |
| 2018/0320885 A1 * | 11/2018 | Musser | F21S 4/28 |
| 2019/0059237 A1 * | 2/2019 | Johnson | F21V 29/503 |
| 2019/0110406 A1 * | 4/2019 | Adams | F21V 5/007 |
| 2019/0124865 A1 * | 5/2019 | Sunnen | A01G 7/02 |
| 2019/0259108 A1 * | 8/2019 | Bongartz | G06Q 50/02 |
| 2020/0037414 A1 * | 1/2020 | Deng | H05B 45/20 |
| 2020/0053967 A1 * | 2/2020 | Murphy | F21S 8/04 |

* cited by examiner

*Primary Examiner* — Peggy A Neils

(57) ABSTRACT

The present invention discloses a plant light supplement lamp and lamp group and a light configuration system and method therefor, the plant light supplement lamp comprising: a mounting main body, which comprises a mounting main beam and an LED driver control box, wherein the LED driver control box is disposed on the mounting main beam and is provided with at least one LED driver and a plurality of interfaces; two dimming assemblies, which is disposed in the LED driver control box and correspondingly electrically connected to the LED driver; and a plurality of LED lamp tubes, which are correspondingly connected to the interfaces.

9 Claims, 11 Drawing Sheets

PLANT LIGHT SUPPLEMENT LAMP AND LAMP GROUP AND LIGHT CONFIGURATION SYSTEM AND METHOD THEREFOR

TECHNICAL FIELD

The present invention relates to plant light supplement lamps, and in particular to a plant light supplement lamp and lamp group and a light configuration system and method therefor.

BACKGROUND ART

Plant light supplement lamp is a lamp which uses lamp-light, instead of sunlight, to provide a light source for plant growth and development according to the natural law of plant growth and the principle that a plant utilizes sunlight to perform photosynthesis. The plant light supplement lamp is widely used in a greenhouse to produce off-season flowers, fruits, vegetables and the like. Due to the short sunshine time, slow crop growth speed and low yield in winter and spring, light supplement is urgent.

Existing plant light supplement lamps can generally adjust the illumination received by a plant only by adjusting light intensity, particularly only manually adjusting the light intensity of a single plant light supplement lamp. In other words, if a plurality of the plant light supplement lamps are mounted in a greenhouse, the manager for the plant light supplement lamps needs to adjust the plant light supplement lamps one by one, which undoubtedly increases the workload of the manager.

In addition, the existing light supplement lamps are all manually controlled, and the illumination intensity of the plant light supplement lamps needs to be adjusted several times a day, which will make the management work of the manager extremely bothersome.

More importantly, a variety of different plants are planted in a greenhouse sometimes, and different plants have different requirements for illumination; therefore, the plant light supplement lamps at different positions in the greenhouse need to operate with different illumination intensities. However, with the continuous growth of the plants in the greenhouse, the illumination intensities required for the plants in the greenhouse will inevitably change, and if the intensity of the plant light supplement lamp at the corresponding position is not adjusted in time, then the growth of the plants will be possibly affected, and the planting success rate of the plants will be affected eventually.

SUMMARY OF THE INVENTION

One object of the present invention is to provide a plant light supplement lamp and lamp group and a light configuration system and method therefor, the plant light supplement lamp comprising at least two light-emitting bodies, wherein the light of the at least two light-emitting bodies can be separately adjusted, and can also be simultaneously adjusted.

Another object of the present invention is to provide a plant light supplement lamp and lamp group and a light configuration system and method therefor, wherein the plant light supplement lamp can be remotely controlled, such that a manager can remotely control the light of the plant light supplement lamp.

Another object of the present invention is to provide a plant light supplement lamp and lamp group and a light configuration system and method therefor, wherein the intensity, color, time duration, etc. of the light emitted by the plant light supplement lamp can be automatically configured according to the category of plants, such that the irradiated plants can grow in an environment with correspondingly required illumination.

Another object of the present invention is to provide a plant light supplement lamp and lamp group and a light configuration system and method therefor, wherein the intensity, color, time duration, etc. of the light emitted by the plant light supplement lamp can be automatically adjusted according to the environment where the plants are located, such that the irradiated plants can grow in an environment with correspondingly required illumination.

In order to realize at least one of the above-mentioned objects of the present invention, the present invention provides a plant light supplement lamp, comprising: a plant light supplement lamp, comprising:

a mounting main body, comprising a mounting main beam and an LED driver control box, wherein the LED driver control box is disposed on the mounting main beam and is provided with at least one LED driver and a plurality of interfaces;

two dimming assemblies, which is disposed in the LED driver control box and correspondingly electrically connected to the LED driver; and a plurality of LED lamp tubes, which are correspondingly connected to the interfaces.

Preferably, the LED lamp tube comprises an LED lamp bead, a heat dissipation body, an LED lamp panel and an LED lamp tube lens disposed on the LED lamp bead.

Preferably, the LED lamp tube lens covers the LED lamp bead, the LED lens is provided with a self-fixed clamping position, and the self-fixed clamping position is connected to the mounting main beam.

Preferably, a main beam and a rapid assembly-and-disassembly assembly are provided on the mounting main beam, wherein a light-emitting body is mounted on the main beam via the rapid assembly-and-disassembly assembly; and the rapid assembly-and-disassembly assembly comprises a mounting interface and a connection part, wherein the mounting interface is provided with a slide rail, the connection part can slide in the slide rail, a fixing fastener is disposed at one end of the slide rail, and the connection part completes assembly and disassembly at one end of the slide rail via the fixing fastener.

Preferably, the plant light supplement lamp further comprises a series-parallel circuit, wherein the plant light supplement lamp is connected to at least one another plant light supplement lamp via the series-parallel circuit, and the series-parallel circuits are connected to a dimming assembly to complete the entire series-parallel control.

Preferably, the two dimming assemblies are divided into a first dimming assembly and a second dimming assembly, and the first dimming assembly and the second dimming assembly share and are controllably connected to one dimming controller, wherein the first dimming assembly comprises two dimming power supplies, and the second dimming assembly comprises one dimming power supply, with the two dimming power supplies of the first dimming assembly being controllably connected to two parts of the entire LED lamp tubes, respectively, and the dimming power supply of the second dimming assembly is controllably connected to the entire LED lamp tubes.

Preferably, the dimming controller comprises two dimming knobs and two regulating circuits, wherein one of the dimming knobs corresponds to one regulating circuit, and the two regulating circuits are correspondingly connected to the dimming power supplies of the first and second dimming assemblies respectively to control and regulate the dimming power supplies.

Preferably, the dimming assemblies of the plant light supplement lamp comprise at least one communication component, wherein the communication component is electrically connected to the dimming controller and is configured to be a remote control communication component.

Preferably, the regulation mode of the dimming controller is selected from one or more of: PWM type voltage regulation, resistance regulation or pulse regulation.

Preferably, the plant light supplement lamp comprises at least one lampshade, wherein the lampshade is disposed on a light transmission path formed from the radiation of the light-emitting body in a manner capable of adjusting the intensity of light passing through the light-emitting body, and the lampshade is mounted on the mounting main body to cover the light-emitting body.

The present invention further provides a plant light supplement lamp group, comprising:

a plurality of plant light supplement lamps; and a lamp group circuit, comprising a plurality of series-parallel circuits, wherein the plant light supplement lamp is connected to at least one another plant light supplement lamp via the series-parallel circuit, and the series-parallel circuits are connected to a dimming assembly to complete the entire series-parallel control.

Preferably, the plant light supplement lamp group further comprises a lamp group controller, wherein the lamp group controller is connected to the series-parallel circuits and controls the plurality of plant light supplement lamps.

Preferably, a light configuration method for a plant light supplement lamp comprises the following steps:

collecting an influence parameter for influence of the growth of a plant which is irradiated by light emitted by the plant light supplement lamp;

analyzing the influence parameter collected by an information collection unit;

generating, according to an analysis result formed, a light configuration policy for controlling the light emitted by a light-emitting body of the plant light supplement lamp; and generating, based on the light configuration policy, a light configuration control signal for controlling the light emitted by the light-emitting body.

Preferably, the influence parameter comprises a parameter for the plant itself which is irradiated by the light emitted by the plant light supplement lamp, and a parameter for an environment surrounding the plant.

Preferably, a light configuration method for a plant light supplement lamp comprises the following steps:

feeding back light which is emitted by at least one plant light supplement lamp based on the light configuration control signal; and adjusting the light configuration policy.

The present invention further provides a light configuration system of a plant light supplement lamp, comprising:

an information collection unit configured to collect an influence parameter for influence of the growth of a plant which is irradiated by light emitted by the plant light supplement lamp; and a control unit, comprising:

an analysis module configured to analyze the influence parameter collected by the information collection unit;

a light configuration policy generation module configured to generate, according to an analysis result formed, a light configuration policy for controlling the light emitted by a light-emitting body of the plant light supplement lamp; and a control signal generation module configured to generate, based on the light configuration policy, a light configuration control signal for controlling the light emitted by the light-emitting body.

Preferably, the light configuration system of a plant light supplement lamp comprises a feedback unit, wherein the feedback unit is communicably connected to the information collection unit as well as the analysis module of the control unit, and is configured to feed back the intensity of the light which is emitted by the light-emitting body under the control of the light configuration control signal; and the analysis module analyzes data fed back by the feedback module, and then automatically adjusts the light configuration policy generated by the light configuration policy generation module.

DETAILED DESCRIPTION OF EMBODIMENTS

Specific embodiments of the present invention will be further described below in conjunction with the drawings. It should be noted here that the description of the embodiments is intended to help understand the present invention, but does not constitute a limitation to the present invention. In addition, the technical features involved in the embodiments of the present invention described below can be combined with each other as long as they do not constitute a conflict with each other.

Figure 1:
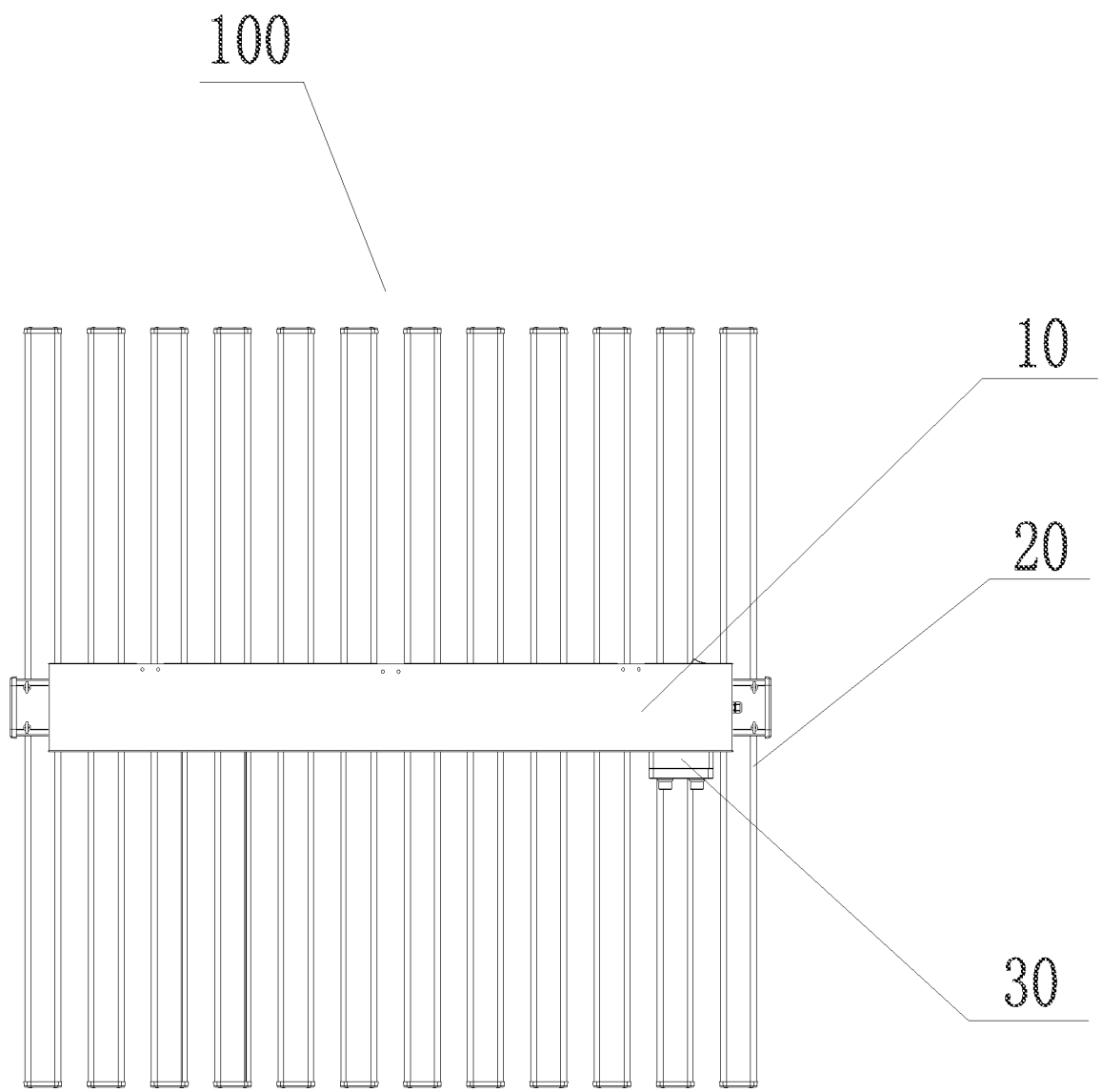
FIG. 1 shows an overall schematic diagram of the plant light supplement lamp of the present invention.
Figure 2A:
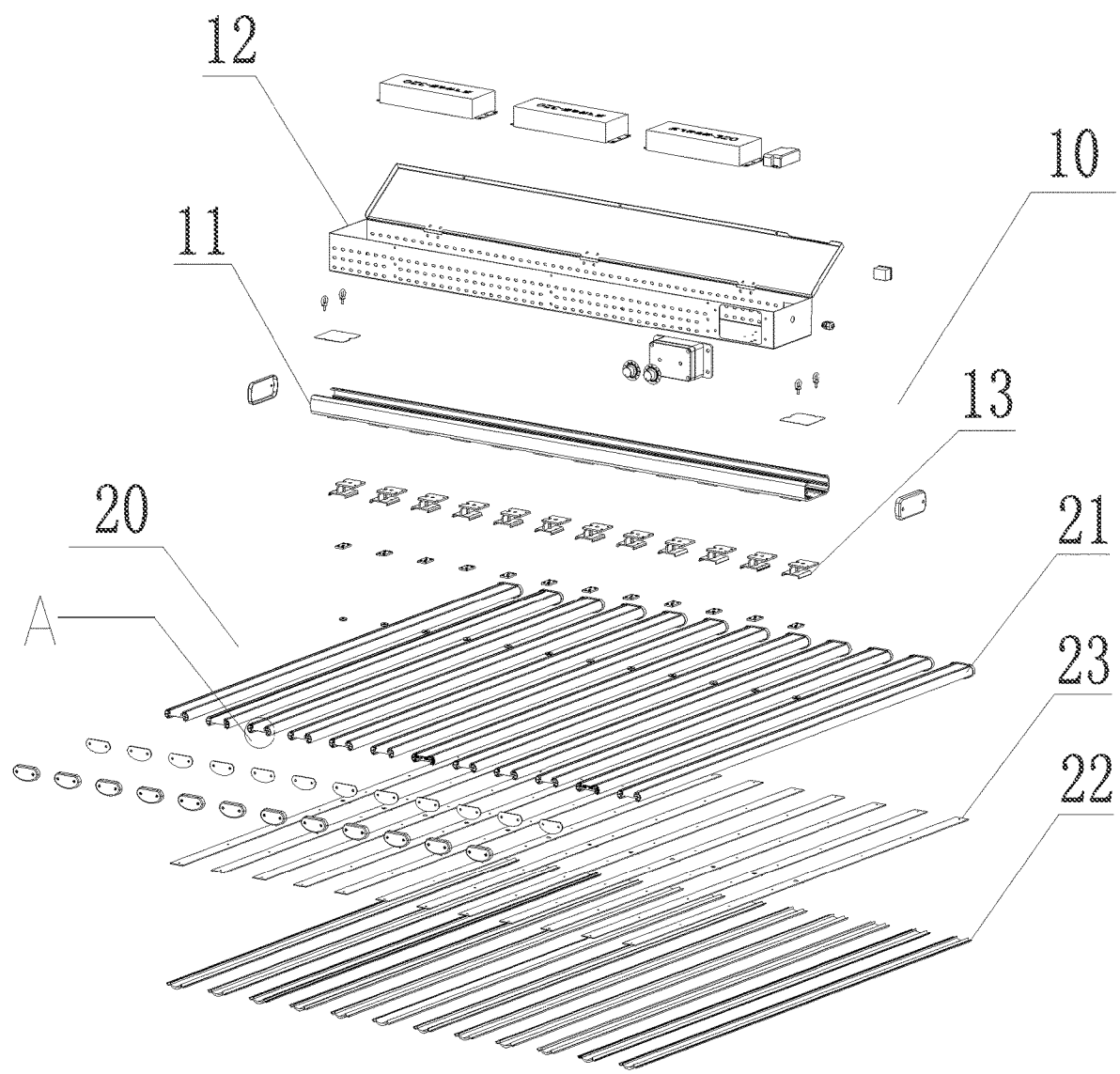
FIG. 2A shows an exploded schematic diagram of the plant light supplement lamp of the present invention.
Figure 2B:
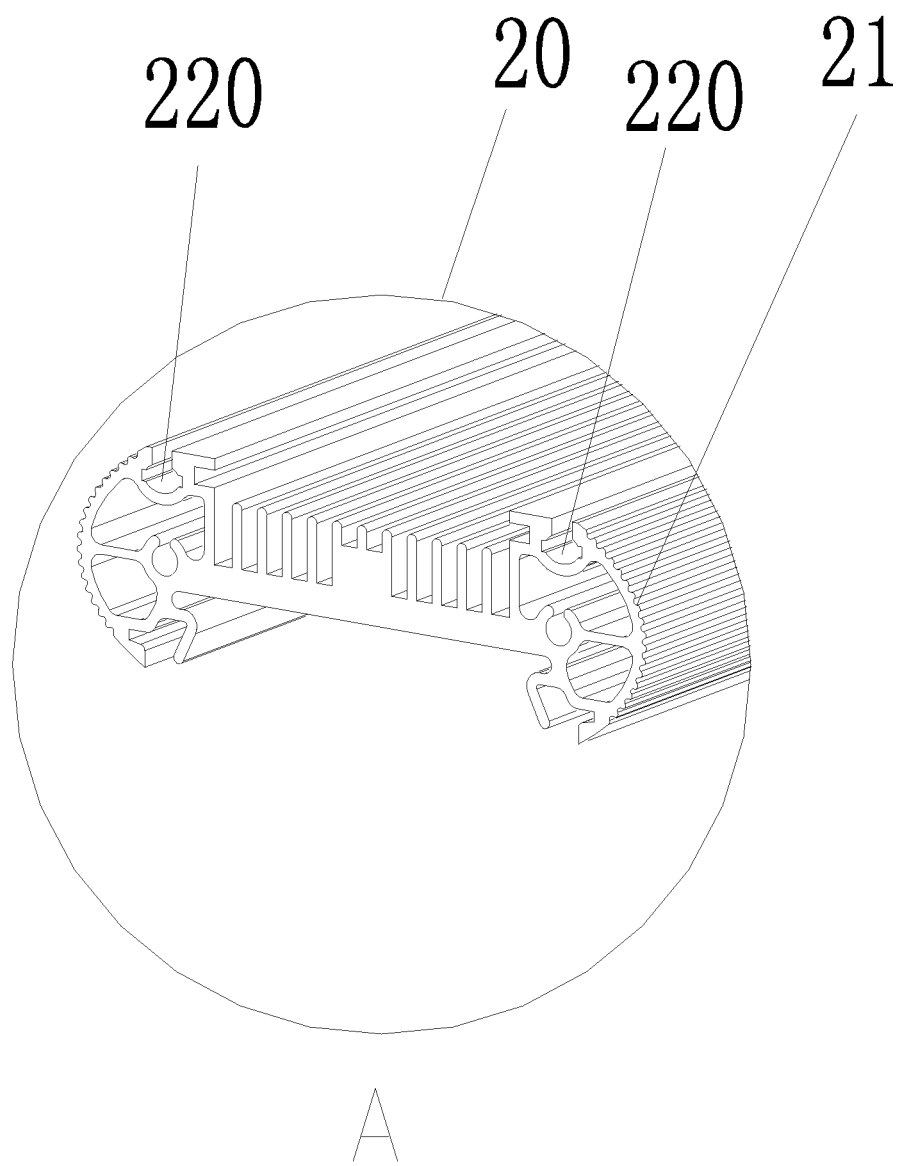
FIG. 2B shows a detailed cross-sectional schematic diagram at A of an LED lamp tube of the plant light supplement lamp as shown in FIG. 2 of the present invention.

As shown in FIGS. 1, 2A and 2B, the present invention discloses a plant light supplement lamp 100, the plant light supplement lamp 100 comprising a mounting main body 10, an LED lamp tube 20, and at least two dimming assemblies 30, wherein the mounting main body 10 comprises a mounting main beam 11 and an LED driver control box 12, with the LED driver control box 12 being disposed on the mounting main beam 11, and the LED driver control box 12 being provided with at least one LED driver and a plurality of interfaces; in the LED driver control box 12, the dimming assemblies 30 are correspondingly electrically connected to the LED driver; and a plurality of the LED lamp tubes 20 are correspondingly connected to the interfaces, such that the LED driver control box 12 can complete the control of the LED lamp tubes 20.

In the embodiments of the present invention, each of the LED lamp tubes 20 is separately controllably connected to the dimming assembly 30. Certainly, the plurality of LED lamp tubes 20 can also be controlled by one dimming assembly 30, such that the light emitted by at least two of the LED lamp tubes 20 can be simultaneously adjusted, and the light emitted by each of the LED lamp tubes 20 can also be separately adjusted.

Figure 3:
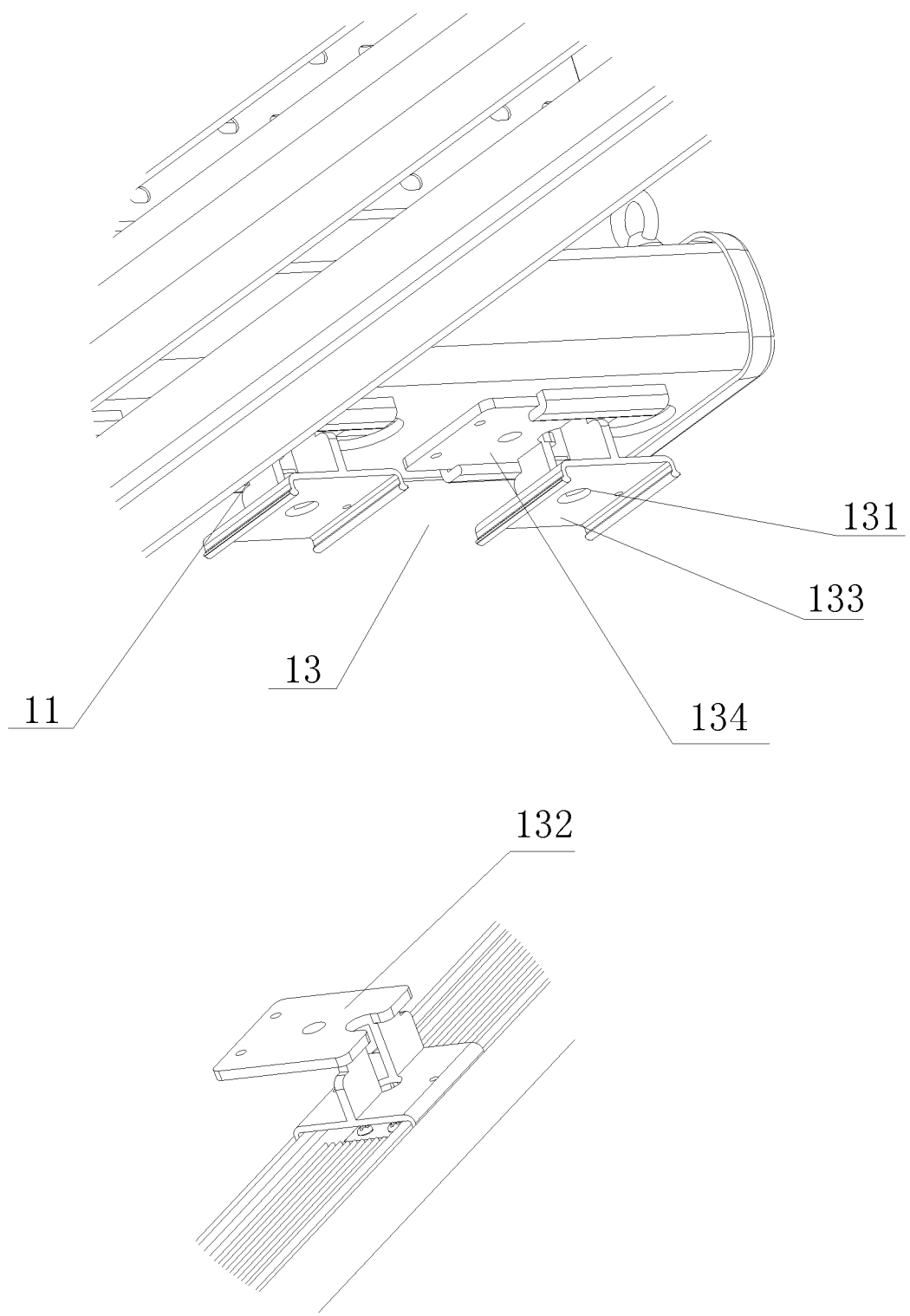
FIG. 3 shows a rapid disassembly schematic diagram of the plant light supplement lamp of the present invention.

As shown in FIG. 3, in the mounting main beam 11, the LED lamp tubes 20 can be rapidly disassembled, so as to increase or decrease the quantity thereof. Specifically, a rapid assembly-and-disassembly assembly 13 is provided on the mounting main beam 11, wherein the LED lamp tubes 20 are mounted on the mounting main beam 11 via the rapid assembly-and-disassembly assembly 13; and the rapid assembly-and-disassembly assembly 13 comprises a mounting interface 131 and a connection part 132, wherein the mounting interface 131 is provided with a slide rail 133, the connection part 132 can slide in the slide rail 133, a fixing fastener 134 is disposed at one end of the slide rail 133, and the connection part 132 completes assembly and disassembly at one end of the slide rail 133 via the fixing fastener 134.

In addition, in the embodiments as shown in FIGS. 1, 2A and 2B, each of the LED lamp tubes 20 can be configured to comprise a lamp body, and preferably, the LED lamp tubes 20 are configured to be LED lamps or the other light source lamps. Furthermore, the plant light supplement lamp 100 comprises at least one lampshade, wherein the lampshade is disposed on a light transmission path formed from the radiation of the light-emitting body in a manner capable of adjusting the intensity of the light passing through the LED lamp tubes 20, and the lampshade is mounted on the mounting main beam 11 to cover the LED lamp tubes 20.

In one embodiment of the present invention, different parts of the lampshade have different thicknesses, and the lampshade is rotatably mounted on the mounting main beam 11, such that when the lampshade rotates, the intensity of the light passing through the LED lamp tubes 20 can be changed.

Figure 4:
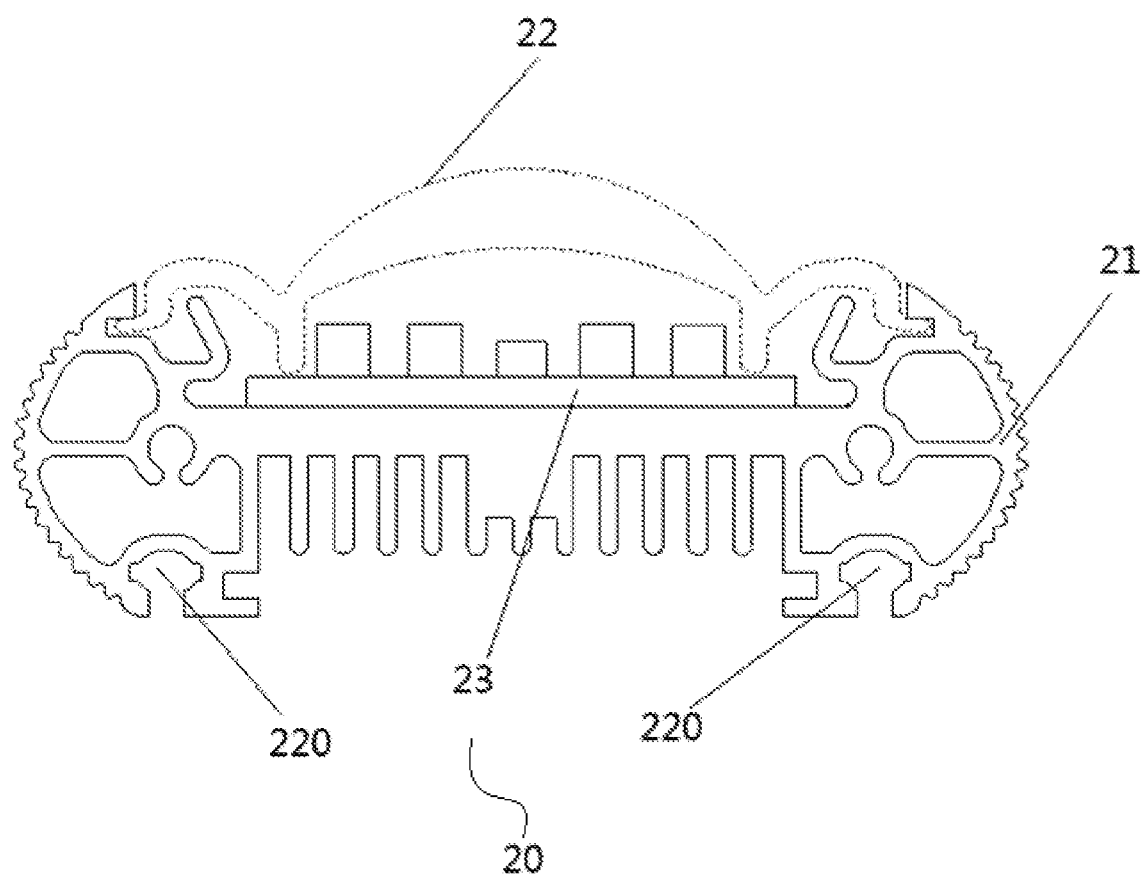
FIG. 4 shows a schematic structural diagram of the LED lamp tube of the plant light supplement lamp of the present invention.

As shown in FIG. 4, it should be noted that an LED lamp bead is disposed in the LED lamp tube 20, the LED lamp tube 20 comprises an LED lens 22, and the lens 22 covers the LED lamp bead. The LED lamp tube is further provided with an LED lamp panel 23 and a heat dissipation body 21, wherein the LED lamp bead is mounted on the LED lamp panel 23, and the heat dissipation body 21 can dissipate the heat of the LED lamp panel 23, so as to avoid damages due to over-high temperature. In addition, the lamp tube 20 is provided with a self-fixed clamping position 220, and the self-fixed clamping position 220 is connected to the rapid assembly-and-disassembly assembly 13. The light transmittance of the lens 22 can be adjusted to a certain extent, so as to change the transmitted light intensity of the lens 22.

In another embodiment of the present invention, the lampshade is detachably mounted on the LED lamp tube 20, such that the intensity of the light passing through the LED lamp tube 20 can be changed by replacing the material of the LED lamp tube 20.

Figure 5:
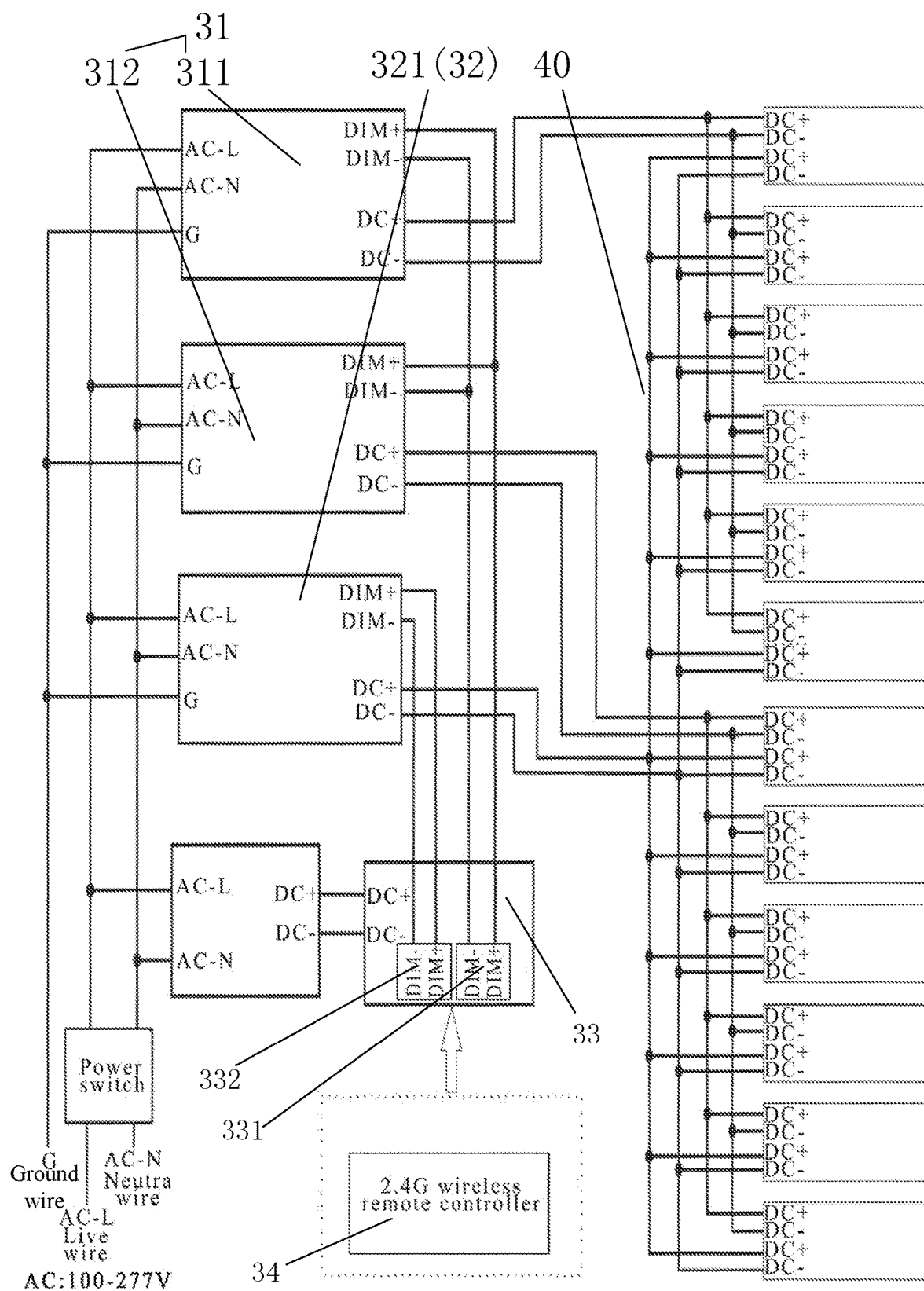
FIG. 5 shows a circuit control schematic diagram of the plant light supplement lamp of the present invention.

As shown in FIG. 5, in a specific embodiment of the present invention, there are two dimming assemblies 30, which are respectively a first dimming assembly 31 and a second dimming assembly 32. The first dimming assembly 31 comprises two dimming power supplies 311 and 312, and the two dimming power supplies 311 and 312 of the first dimming assembly 31 are respectively controllably connected to two parts of all the LED lamp tubes 20. Specifically, there are twelve LED lamp tubes 20, and the twelve lamp tubes can be divided into two parts, which respectively consist of six lamp tubes, wherein one dimming power supply 311 is connected to the six lamp tubes, and the other dimming power supply 312 is connected to the other six lamp tubes. The second dimming assembly 32 comprises a dimming power supply 321, and the dimming power supply 321 is connected to all the twelve lamp tubes.

According to the above-described connection mode, the dimming assembly 30 further comprises a dimming controller 33, the dimming controller 33 comprising two dimming knobs 331 and two regulating circuits 332, wherein one of the dimming knobs 331 corresponds to one regulating circuit 332, and the two regulating circuits 332 are correspondingly connected to the dimming power supplies of the first and second dimming assemblies respectively to control and regulate the dimming power supplies.

That is to say, the two dimming power supplies 311 and 312 of the first dimming assembly 31 can respectively perform control and regulation via the dimming knob 331. The dimming power supply 321 of the second dimming assembly 32 can also perform control and regulation via the other dimming knob 332, such that each of the LED lamp tubes 20 can be regulated via the two dimming assemblies 32. Furthermore, the situation that one of the dimming assemblies fails is avoided, thus greatly improving the regulation operability and anti-risk ability.

In the embodiments above, preferably, at least one of the dimming knobs 32 is electrically connected to the series-parallel circuit, such that an operator can separately or simultaneously adjust the intensity of the light emitted by the LED lamp tubes 20 by respectively operating the two dimming knobs 32. Therefore, one of the dimming knobs 32 can directly control the entire lamp group, and the other dimming knob 32 can separately control each lamp tube.

It is worthy to mention that in the present invention, the dimming controller 33 can also be a remote control dimming controller. The dimming assembly 30 further comprises a communication component 34, wherein the communication component 34 is electrically connected to the dimming controller 33, such that the dimming controller 33 can be remotely connected to the other control terminal, such as a mobile phone, a computer and other portable mobile terminals. Specifically, the communication component 34 can be configured as a 2.4G wireless dimming controller, a Bluetooth dimming controller or a wifi dimming controller, and certainly, the other embodiments, as long as an operation effect of the present invention can be achieved, can also not be limited in this regard.

The regulation mode of the dimming controller 33 can be selected from one or more of: PWM type voltage regulation, resistance regulation or pulse regulation. Specifically, a person skilled in the art can understand that the dimming controller 33 can be configured as a voltage regulator. In other words, in the present invention can regulate the voltages at two ends of at least two of the LED lamp tubes 20, and thus can simultaneously adjust the light emitted by at least two of the LED lamp tubes 20. The dimming controller 33 can be configured as a current regulator. In other words, the present invention can regulate the currents at two ends of at least two of the LED lamp tubes 20, and thus can simultaneously adjust the light emitted by at least two of the LED lamp tubes 20.

A person skilled in the art can understand that since the light emitted by at least two of the LED lamp tubes 20 in the plant light supplement lamp 100 can be simultaneously remotely adjusted, an operator does not need to repeatedly return to the position where the plant light supplement lamp 100 is mounted. In another embodiment of the present invention, the LED lamp tubes 20 are connected, in a manner that the light intensity thereof is adjustable, to the dimming assemblies 30 via the series-parallel circuit 40, such that the luminance of different lamp tubes in the present invention can be simultaneously adjusted via two circuits.

In addition, the plant light supplement lamp 100 comprises a plurality of series-parallel circuits 40, wherein the plant light supplement lamp 100 is connected to at least one another plant light supplement lamp 100 via the series-parallel circuit 40, and the series-parallel circuits 40 are connected to the dimming assemblies 30 to complete the entire series-parallel control. That is to say, a plurality of plant light supplement lamps 100 can be connected via the series-parallel circuits 40 and controlled via the dimming assemblies 30.

A person skilled in the art can understand that the communication component 34 can be configured as a Bluetooth module, a WiFi module, a Lifi module, a Zigbee module, etc.

Figure 6:
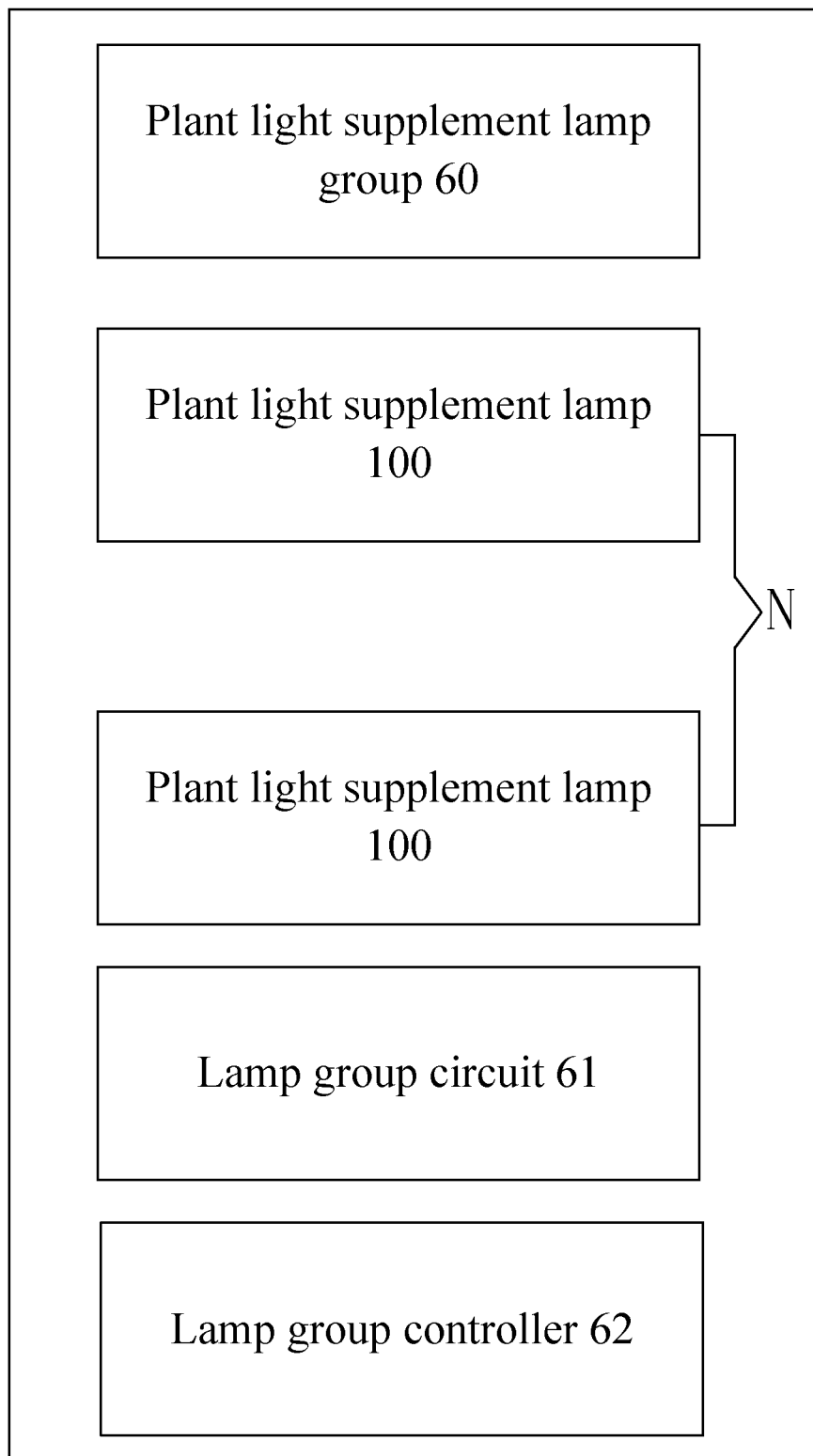
FIG. 6 shows a structural block diagram of a plant light supplement lamp group of the present invention.

With reference to FIG. 6, according to another aspect of the present invention, the present invention provides a plant light supplement lamp group 60, the plant light supplement lamp group 60 comprising any one of the above-described plant light supplement lamps 100, at least one lamp group circuit 61 and at least one lamp group controller 62, wherein the plant light supplement lamp 100 is controllably connected to the lamp group controller 62 via the lamp group circuit 61. Specifically, the lamp group controller 62 can control a plurality of the plant light supplement lamps 100. The lamp group circuit 61 comprises a plurality of series-parallel circuits 40, such that the plant light supplement lamp 100 can complete the systematical control of one lamp group.

Figure 7:
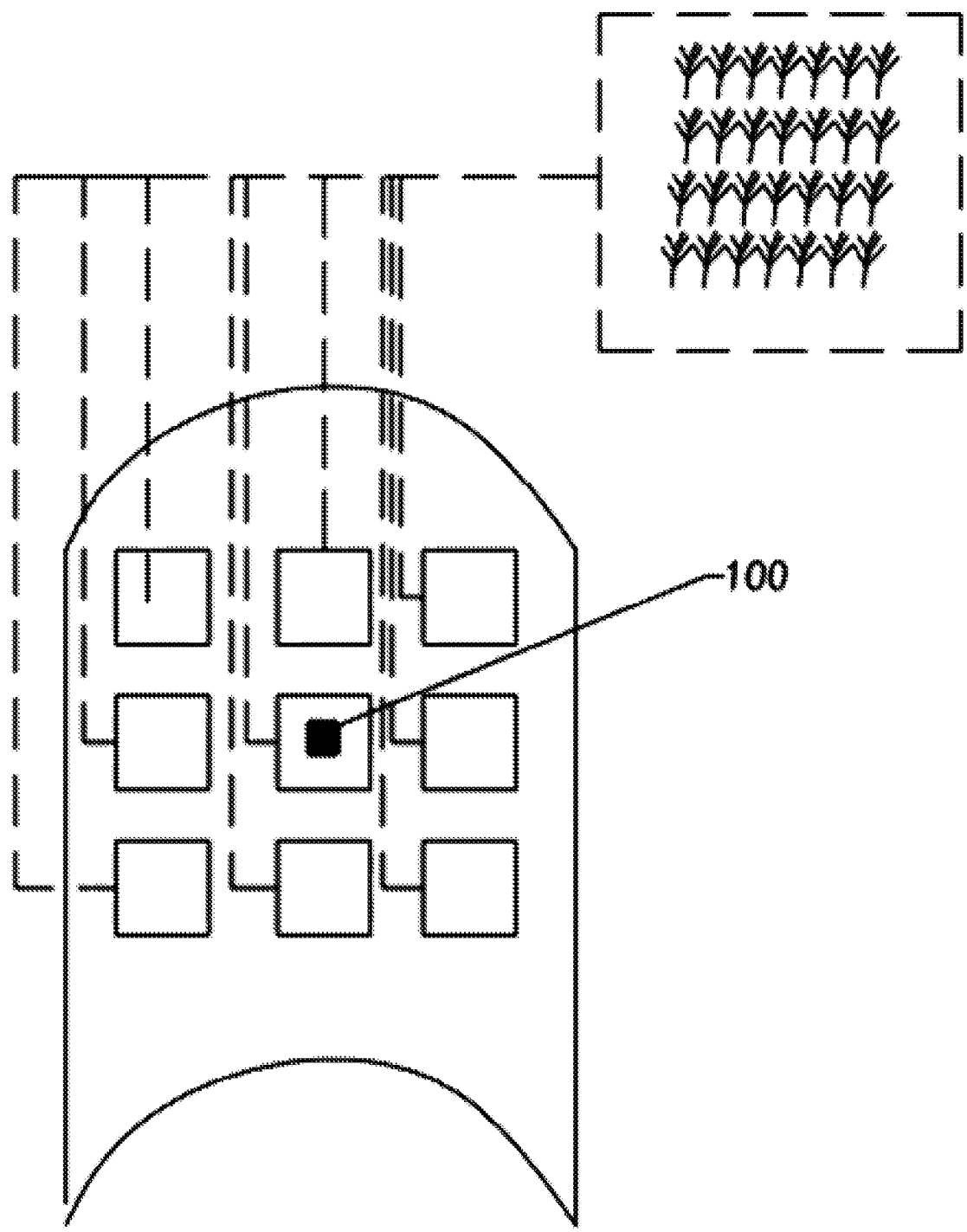
FIG. 7 shows a schematic diagram of the plant light supplement lamp of the present invention after being automatically controlled based on a light configuration control signal.
Figure 8:
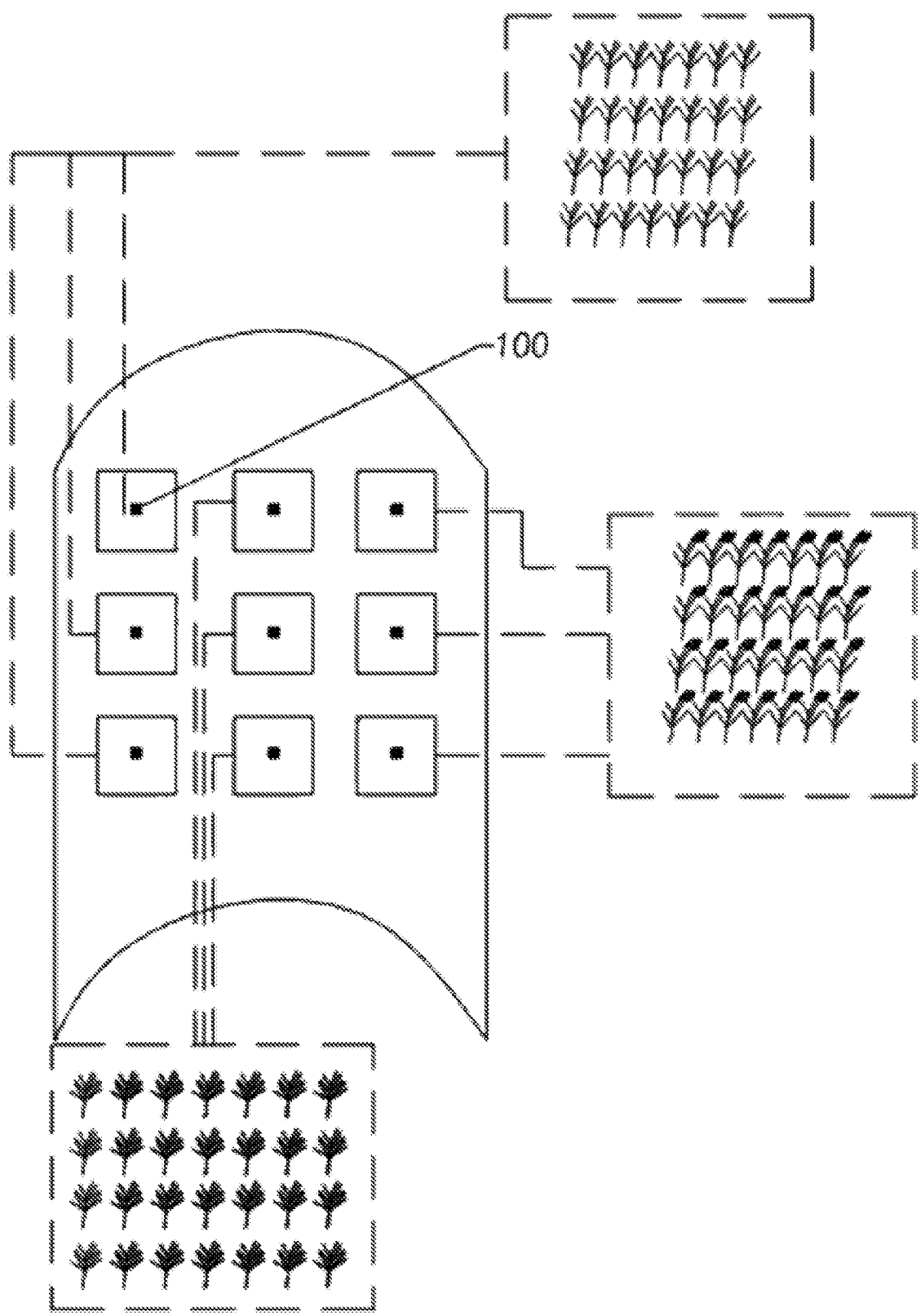
FIG. 8 shows a schematic diagram of the plant light supplement lamp of the present invention when being automatically controlled based on the adjusted light configuration control signal.
Figure 9:
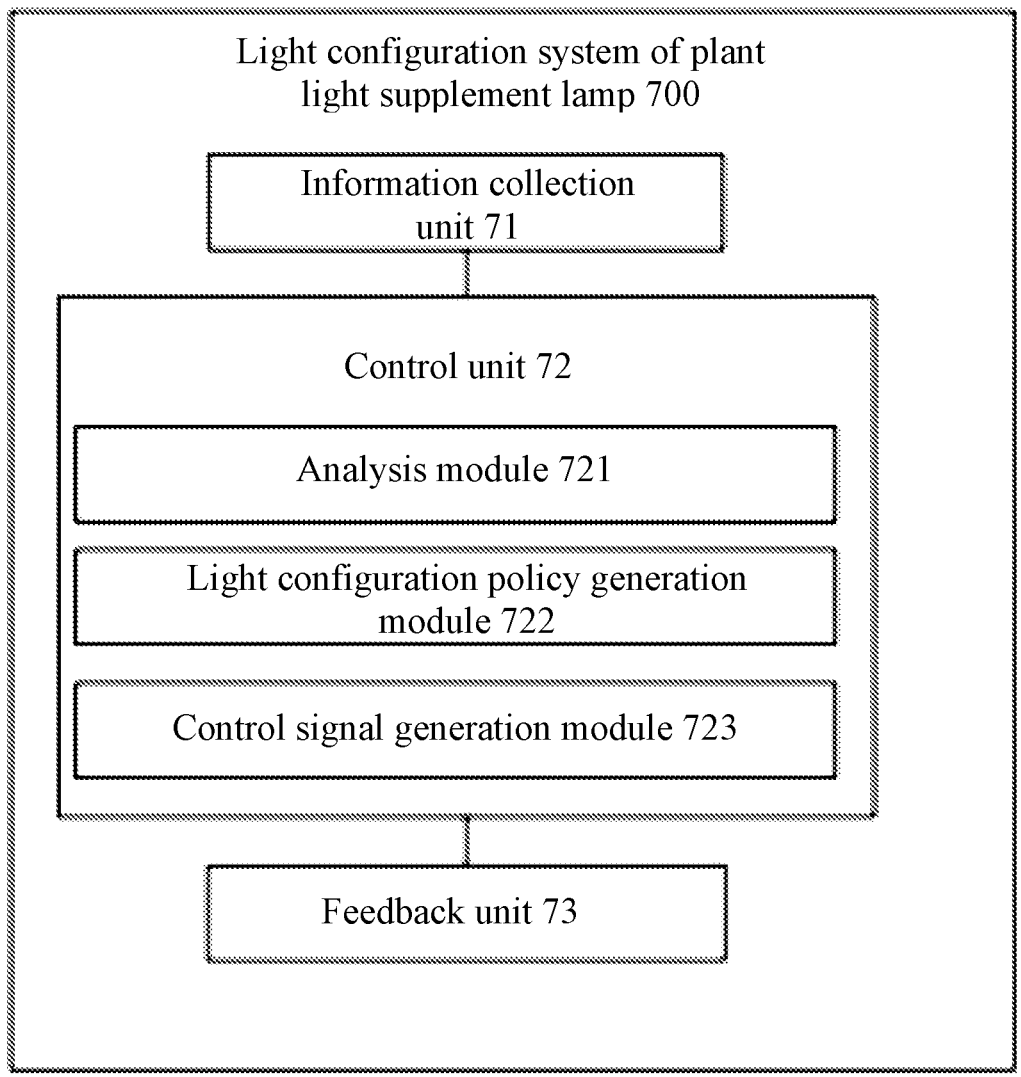
FIG. 9 shows a structural block diagram of a light configuration system of the plant light supplement lamp of the present invention.

As shown in FIGS. 7, 8 and 9, the present invention further comprises a light configuration system 700, the light configuration system 700 for a plant light supplement lamp comprising an information collection unit 71 and a control unit 72. The control unit 72 is communicably connected to the information collection unit 71. The control unit 72 is configured to be communicably connected to a communication component 50, such that the dimming controller 33 can automatically adjust the emitted light based on the light configuration system 700 for a plant light supplement lamp.

In the present invention, the information collection unit 71 is configured to be able to collect an influence parameter for influence of the growth of a plant which is irradiated by light emitted by the plant light supplement lamp 100.

For example, the information collection unit 71 is configured to be able to collect parameters such as a parameter of carbon dioxide concentration surrounding the plant which is irradiated by the light emitted by the plant light supplement lamp 100, a parameter relating to the variety of the plant, a parameter of current season of the plant, and a parameter of ambient light surrounding the plant.

The control unit 72 can generate a light configuration policy based on the influence parameter, and generate a light configuration control signal based on the light configuration policy. In the present invention, the plant light supplement lamp 100 can automatically control the light emitted by the LED lamp tubes 20 based on the light configuration control signal.

A person skilled in the art can understand that since the plant light supplement lamp 100 can automatically configure the light emitted by the plant light supplement lamp 100 based on the light configuration control signal generated by the light configuration system 700 of the plant light supplement lamp, the light emitted by the plant light supplement lamp 100 is closer to the light required in a growth cycle of the plant, such that the plant can better grow.

Specifically, in the present invention, the control unit 72 comprises an analysis module 721, a light configuration policy generation module 722 and a control signal generation module 723. The light configuration policy generation module 722 is communicably connected to the analysis module 721 and the control signal generation module 723. The analysis module 721 is communicably connected to the information collection unit 71 to analyze the influence parameter collected by the information collection unit 71. The light configuration policy generation module 722 generates, according to an analysis result formed by the analysis module 721, a light configuration policy for controlling the light emitted by the LED lamp tubes 20 of the plant light supplement lamp 100. Specifically, the analysis module 721 can acquire corresponding standard parameters for the growth of the plant which is irradiated by the plant light supplement lamp 100, such as a standard parameter relating to carbon dioxide concentration, and a parameter relating to an illumination cycle.

The control signal generation module 723 generates, based on the light configuration policy, a light configuration control signal for controlling the light emitted by the LED lamp tubes 20.

A person skilled in the art can understand that the information collection unit 71 can acquire the carbon dioxide concentration in the growth environment of the plant from a carbon dioxide sensor disposed in a greenhouse mounted with the plant light supplement lamp 100, and that the information collection unit 71 can also pre-store parameters relating to the variety of the plant which is irradiated by the plant light supplement lamp 100, and can also acquire the carbon dioxide concentration in the growth environment of the plant from a light sensor disposed in a greenhouse mounted with the plant light supplement lamp 100.

For example, in one example of the present invention, the information collection unit 71 can collect a parameter relating to the plant self which is irradiated by at least one of the plant light supplement lamps 100, such as the variety of the plant, and the position of the plant light supplement lamp 100 relative to the plant which is irradiated by the plant light supplement lamp 100. The analysis module 721 can perform analysis based on the acquired variety of the plant to obtain a required illumination intensity and illumination time of the plant in a corresponding season. The light configuration policy generation module 722 can automatically generate a light configuration policy based on the analysis result formed by the analysis module 721.

For example, in this embodiment, the light configuration policy generation module 722 can automatically configure, based on an analysis result formed by the analysis module 721, an illumination intensity and time of the LED lamp tubes 20 that are respectively regulated by the dimming assemblies 30 in the plant light supplement lamp 100. The control signal generation module 723 of the control unit 72 automatically generates, based on the light configuration policy, a light configuration control signal for controlling the illumination intensity and time of the LED lamp tubes 20 of the plant light supplement lamp 100.

For example, the plant light supplement lamp 100 is automatically controlled based on the light configuration control signal. such that a part of the LED lamp tubes 20 does not emit light, and the other part of the LED lamp tubes 20 emits light, and thus the plant which is irradiated by the plant light supplement lamp 100 can obtain intensity-appropriate illumination.

For another example, in the embodiments as shown in FIGS. 7 and 8, the information collection unit 71 can collect a parameter relating to the environment surrounding the plant which is irradiated by the plant light supplement lamp 100. For example, in this example, the information collection unit 71 can automatically collect parameters relating to the carbon dioxide concentration of the environment surrounding the plant and the illumination intensity in the environment.

The analysis module 721 of the control unit 72 can perform analysis based on the parameter relating to the environment surrounding the plant and collected by the information collection unit 71, so as to determine whether the growth environment of the plant is suitable for the growth of the plant. The light configuration policy generation module 722 can generate, based on an analysis result formed by the analysis module 721, the corresponding light configuration policy. The control signal generation module 723 will correspondingly generate the light configuration control signal. For example, in this example, the light intensity of the LED lamp tubes 20 can be automatically adjusted based on the light configuration control signal generated by the control signal generation module 723, such that the plant which is irradiated by the plant light supplement lamp 100 can obtain intensity-appropriate illumination.

A person skilled in the art can understand from the descriptions above that the plant light supplement lamp 100 can automatically configure light based on the light configuration system 700 of the plant light supplement lamp.

It is worthy to mention that the light configuration system 700 of the plant light supplement lamp comprises a feedback unit 73, wherein the feedback unit 73 is communicably connected to the information collection unit 71 as well as the analysis module of the control unit 72.

Various different plants may be planted in a greenhouse sometimes, which will result in differences in the light configured for the various different plants, and may cause interference with each other. The feedback unit 73 is configured to be able to feed back the intensity of light emitted by the LED lamp tubes 20 under the control of the light configuration control signal. The analysis module 721 analyzes the data fed back by the feedback unit 73, and then automatically adjusts the light configuration policy generated by the light configuration policy generation module 722, such that the light configuration control signal generated by the control signal generation module 723 can be adjusted.

A person skilled in the art can understand that the light configuration control signal can be adjusted based on the feedback result of the feedback unit 73, such that the various different plants can correspondingly receive appropriate illumination, and then the plants can better grow.

Figure 10:
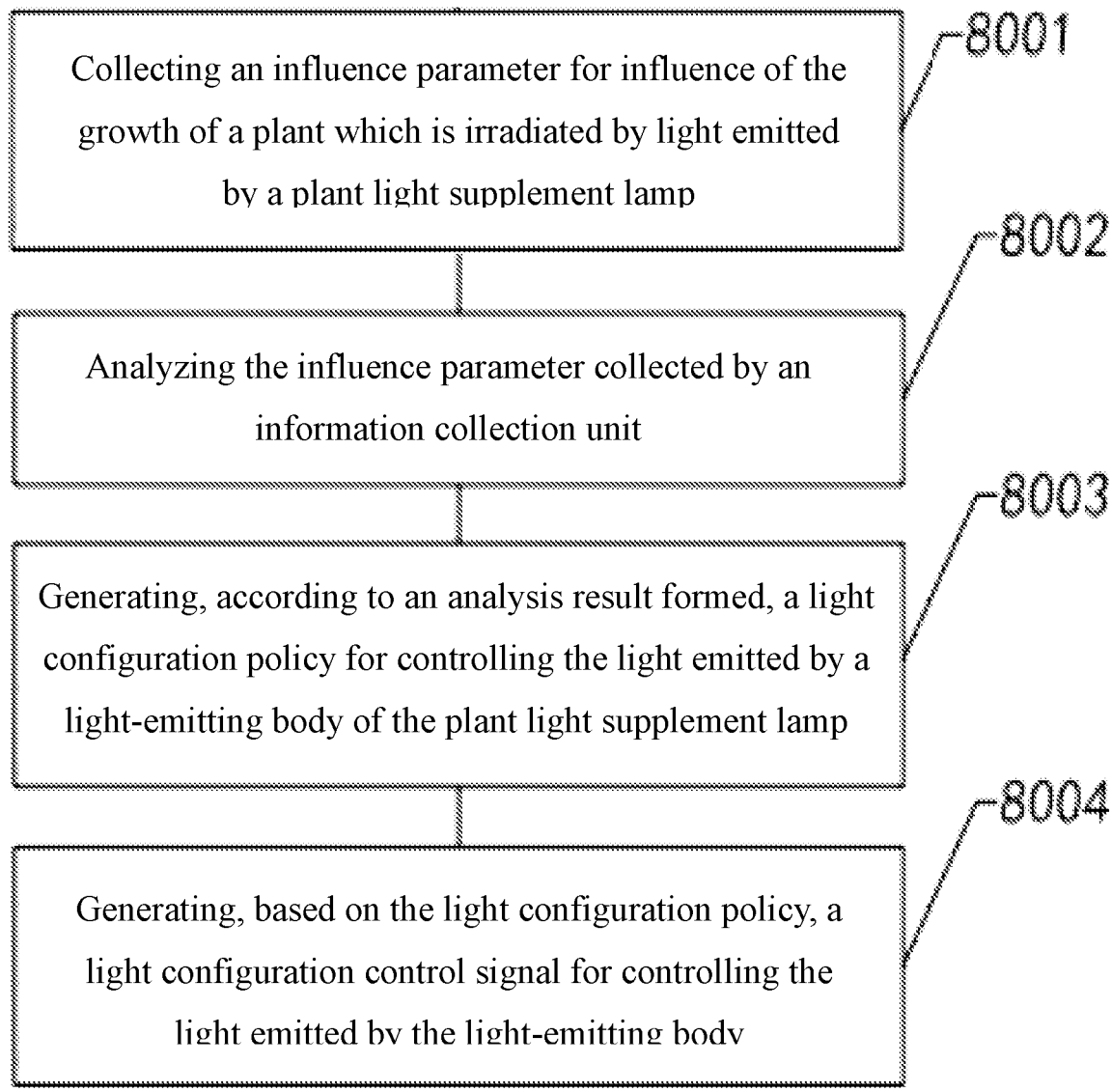
FIG. 10 shows a flow chart of a light configuration method for the plant light supplement lamp of the present invention.

With reference to FIG. 10, according to another aspect of the present invention, the present invention discloses a light configuration method for a plant light supplement lamp, the light configuration method for a plant light supplement lamp comprising the following steps:

8001, collecting an influence parameter for influence of the growth of a plant which is irradiated by light emitted by the plant light supplement lamp;

8002, analyzing the influence parameter collected by an information collection unit;

8003, generating, according to an analysis result formed, a light configuration policy for controlling the light emitted by a light-emitting body of the plant light supplement lamp; and 8004, generating, based on the light configuration policy, a light configuration control signal for controlling the light emitted by the light-emitting body.

It is worthy to mention that the influence parameter comprises a parameter for the plant itself which is irradiated by the light emitted by the plant light supplement lamp, and a parameter for an environment surrounding the plant.

It is more worthy to mention that the light configuration method for a plant light supplement lamp comprises the following steps:

feeding back light which is emitted by at least one plant light supplement lamp based on the light configuration control signal; and adjusting the light configuration policy.

The embodiments of the present invention are described in detail above in conjunction with the accompanying drawings, but the present invention is not limited to the described embodiments. For a person skilled in the art, various changes, modifications, substitutions and variations made to the embodiments still fall within the scope of protection of the present invention without departing from the principles and spirit of the present invention.

The invention claimed is:

1. A plant light supplement lamp, comprising:
a mounting main body, comprising a mounting main beam and an LED driver control box, wherein the LED driver control box is disposed on the mounting main beam and is provided with at least one LED driver and a plurality of interfaces;
two dimming assemblies, which is disposed in the LED driver control box and correspondingly electrically connected to the LED driver; and
a plurality of LED lamp tubes, which are correspondingly connected to the interfaces;
wherein the two dimming assemblies are divided into a first dimming assembly and a second dimming assembly, and the first dimming assembly and the second dimming assembly share and are controllably connected to one dimming controller, wherein the first dimming assembly comprises two dimming power supplies, and the second dimming assembly comprises one dimming power supply, with the two dimming power supplies of the first dimming assembly being controllably connected to two parts of all the LED lamp tubes, respectively, and the dimming power supply of the second dimming assembly is controllably connected to the entire LED lamp tubes.

2. The plant light supplement lamp according to claim 1, wherein the LED lamp tube comprises a heat dissipation body, an LED lamp panel and an LED lamp tube lens disposed on the LED lamp panel, wherein the heat dissipation body is mounted on the LED lamp panel.

3. The plant light supplement lamp according to claim 1, further comprising a series-parallel circuit, wherein the plant light supplement lamp is connected to at least one another plant light supplement lamp via the series-parallel circuit, and the series-parallel circuit is connected to the dimming assemblies to complete the entire series-parallel control.

4. The plant light supplement lamp according to claim 2, further comprising a series-parallel circuit, wherein the plant light supplement lamp is connected to at least one another plant light supplement lamp via the series-parallel circuit, and the series-parallel circuit is connected to the dimming assemblies to complete the entire series-parallel control.

5. The plant light supplement lamp according to claim 1, wherein the dimming controller comprises two dimming knobs and two regulating circuits, wherein one of the dimming knobs corresponds to one regulating circuit, and the two regulating circuits are correspondingly connected to the dimming power supplies of the first and second dimming assemblies respectively to control and regulate the dimming power supplies.

6. The plant light supplement lamp according to claim 5, wherein the dimming assemblies of the plant light supplement lamp comprise at least one communication component, wherein the communication component is electrically connected to the dimming controller and is configured to be a remote control communication component.

7. The plant light supplement lamp according to claim 6, wherein the regulation mode of the dimming controller is selected from one or more of: PWM type voltage regulation, resistance regulation or pulse regulation.

8. A plant light supplement lamp group, comprising:
a plurality of plant light supplement lamps; and
a lamp group circuit, comprising a plurality of series-parallel circuits, wherein the plant light supplement lamp is connected to at least one another plant light supplement lamp via the series-parallel circuit, and the series-parallel circuits are connected to a dimming assembly to complete the entire series-parallel control;
each plant light supplement lamp comprising:

a mounting main body, comprising a mounting main beam and an LED driver control box, wherein the LED driver control box is disposed on the mounting main beam and is provided with at least one LED driver and a plurality of interfaces;

two dimming assemblies, which is disposed in the LED driver control box and correspondingly electrically connected to the LED driver; and a plurality of LED lamp tubes, which are correspondingly connected to the interfaces;

wherein the two dimming assemblies are divided into a first dimming assembly and a second dimming assembly, and the first dimming assembly and the second dimming assembly share and are controllably connected to one dimming controller, wherein the first dimming assembly comprises two dimming power supplies, and the second dimming assembly comprises one dimming power supply, with the two dimming power supplies of the first dimming assembly being controllably connected to two parts of all the LED lamp tubes, respectively, and the dimming power supply of the second dimming assembly is controllably connected to the entire LED lamp tubes.

9. The plant light supplement lamp group according to claim 8, further comprising a lamp group controller, wherein the lamp group controller is connected to the series-parallel circuits and controls the plurality of plant light supplement lamps.

* * * * *